United States Patent
Muruganandam et al.

(10) Patent No.: US 6,538,081 B2
(45) Date of Patent: Mar. 25, 2003

(54) POLYMERIZATION PROCESS

(76) Inventors: Natarajan Muruganandam, 4 McIntire Dr., Belle Mead, NJ (US) 08502; Xinmin Yang, 14 Marco Polo Ct., Franklin Park, NJ (US) 08823; Frederick J. Karol, 157 Skyline Dr., Lakewood, NJ (US) 08701

(*) Notice: Subject to any disclaimer, the term of this patent is extended or adjusted under 35 U.S.C. 154(b) by 44 days.

(21) Appl. No.: 09/739,178

(22) Filed: Dec. 18, 2000

(65) Prior Publication Data

US 2002/0115804 A1 Aug. 22, 2002

(51) Int. Cl.[7] .............. C08F 4/44; C08F 4/642; C08F 4/643
(52) U.S. Cl. .......... 526/160; 526/133; 526/134; 526/153; 526/901; 264/464
(58) Field of Search ............... 526/133, 134, 526/160, 153; 264/464

(56) References Cited

U.S. PATENT DOCUMENTS

| 5,391,661 A | * | 2/1995 | Naganuma et al. | ......... 526/133 |
|---|---|---|---|---|
| 5,684,098 A | | 11/1997 | Wang et al. | ............ 526/133 |
| 5,712,352 A | | 1/1998 | Brant et al. | ............ 526/68 |
| 5,753,577 A | | 5/1998 | Hamura et al. | ........... 502/113 |
| 6,232,407 B1 | * | 5/2001 | Hashidzume et al. | .... 525/331.7 |

OTHER PUBLICATIONS

Hawley's Condensed Chemical Dictionary, John Wiley & Sons, 1997, p. 718.*
Grant & Hackh's Chemical Dictionary, McGraw–Hill, 1987, p. 364.*

* cited by examiner

*Primary Examiner*—David W. Wu
*Assistant Examiner*—R. Rabago
(74) *Attorney, Agent, or Firm*—Osborn K. McKinney

(57) ABSTRACT

The invention provides a process for reducing the low molecular weight oligomer content of olefin polymers produced by metallocene catalysis wherein at least one organometallic compound is fed continuously into the reactor during polymerization. The organometallic compound has the formula $R^1_n A$, wherein A is a Periodic Table Group 12 or 13 element. $R^1$ is the same or different, substituted or unsubstituted, straight or branched chain alkylradical, cyclic hydrocarbyl radical, alkyl-cyclohydrocarbyl radical, aromatic radical or alkoxide radical and n is 2 or 3, to form a polymer product having a content of said compound of at least about 50 weight ppm.

12 Claims, No Drawings

POLYMERIZATION PROCESS

FIELD OF THE INVENTION

The present invention relates to a polymerization process. In particular, the invention relates to a process for improving the processability of bulky ligand metallocene catalyzed polymers by reducing the oligomer content. More specifically, the process of the invention utilizes an organometallic compound to reduce low molecular weight species which may cause the polymer to smoke during processing operations.

BACKGROUND OF THE INVENTION

Bulky ligand metallocene catalyst systems are utilized to produce a diverse array of new polymers for use in a wide variety of applications and products. Typical bulky ligand metallocene compounds are generally described as containing one or more ligands, usually, cyclopentadienyl derived ligands or moieties, in combination with a transition metal selected from Group 4, 5 or 6 or from the lanthanide and actinide series of the Periodic Table of Elements. Exemplary of the development of these and other metallocene catalyst compounds and catalyst systems are described in U.S. Pat. Nos. 5,017,714, 5,055,438, 5,096,867, 5,198,401, 5,229,478, 5,264,405, 5,278,119, 5,324,800, 5,384,299, 5,408,017, 5,491,207 and 5,621,126 all of which are herein fully incorporated by reference Experience has demonstrated that, for example, where such relatively high molecular weight catalysts are used to polymerize ethylene, relatively high volumes of hydrogen gas must be present in the gaseous reaction medium in order to control the molecular weight of the polymer product such that a processable polymer having good melt flow properties can be achieved. Generally, $H_2$:ethylene mole ratios of from about 0.006 to 0.035 may be required to appropriately control molecular weight of the polymer product. At these relatively high hydrogen concentrations, chain termination during polymerization tends to give rise to a polymer product which contains from about 0.4 up to about 2 wt % of low molecular weight polymer species (oligomers) which generally exhibit a molecular weight ($M_n$) of 200 up to about 1000. During thermoprocessing of the resulting polymer product, such as extrusion, the presence of these oligomers in the polymer gives rise to a phenomenon known as "extrusion smoking", which smoke is believed to be caused by a combination of vaporization and thermal decomposition of these low molecular weight species.

Organometallic compounds, for example, aluminum alkyls such as triethyl aluminum, are used as "scavengers" in metallocene catalyzed polymerization processes. These compounds are often introduced into the polymerization reactor environment at the onset of polymerization, but their introduction is then terminated or markedly reduced as polymerization proceeds. Contrary to the findings of the present invention, it is suggested in U.S. Pat. No. 5,712,352 that the presence of such scavengers during polymerization at levels of greater than 10 ppm, based on the weight of the reactor recycle stream, actually encourages the formation of low molecular weight oligomers during polymerization, and thus it is the goal of that patent to provide a process where the polymerization medium is free or essentially free of scavenger.

Accordingly, it would be advantageous to provide a polymerization process for producing olefin polymers and copolymers using metallocene catalyst systems which are processable, of controlled molecular weight, and which also contain a minimum amount of low molecular weight oligomer species which species tend to give rise to the evolution of smoke when thermoprocessed.

SUMMARY OF THE INVENTION

This invention provides a polymerization process for polymerizing olefin(s) in the presence of a bulky ligand metallocene catalyst system in utilizing at least one organometallic compound represented by the formula $R^1{}_nA$ wherein A is a Periodic Table Group 12 or 13 element. $R^1$ is the same or different, substituted or unsubstituted, straight or branched chain alkyl radical, cyclic hydrocarbyl radical, alkyl-cyclohydrocarbyl radical, aromatic radical or alkoxide radical and n is 2 or 3.

It has been found that the continuous introduction of the organometallic compound during the polymerization process significantly reduces the content of low molecular weight oligomer species ($M_n$ of about 200–1000) which are formed in the polymer product, thereby reducing or eliminating the evolution of smoke from thermoprocessing equipment when the polymer is processed.

DETAILED DESCRIPTION OF THE INVENTION

The invention relates to the use of an organometallic compound to reduce the presence of low molecular weight species in bulky ligand metallocene catalyzed polymerization processes. The presence of these oligomers in the polymer gives rise to a phenomenon known as "extrusion smoking" during thermoprocessing, which smoke is believed to be caused by a combination of vaporization and thermal decomposition of these low molecular weight species.

Bulky Ligand Metallocene Catalyst Compounds

The process of the invention provides polymers of enhanced processability by the addition of an organometallic compound during polymerization. Specifically the process of the invention enhances the processability of polyethylene polymers, produced in polymerization processes catalyzed by bulky ligand metallocene catalyst compounds. Generally, these catalyst compounds include half and full sandwich compounds having one or more bulky ligands bonded to at least one metal atom. Typical bulky ligand metallocene compounds are described as containing one or more bulky ligand(s) and one or more leaving group(s) bonded to at least one metal atom.

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the polymerization process of the invention utilizes a bulky ligand metallocene catalyst compounds represented by the Formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that Formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the polymerization process of the invention utilizes a bulky ligand metallocene catalyst compounds of Formula (II) where $L^A$ and $L^B$ are bridged to each other by at least one bridging group, A, as represented in the following formula:

$$L^A A L^B MQ_n \qquad (II)$$

These bridged compounds represented by Formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula (II) have two or more bridging groups A (EP 664 301 B1).

In another embodiment, the bulky ligand metallocene catalyst compounds are those where the R substituents on the bulky ligands $L^A$ and $L^B$ of Formulas (I) and (II) are substituted with the same or different number of substituents on each of the bulky ligands. In another embodiment, the bulky ligands $L^A$ and $L^B$ of Formulas (I) and (II) are different from each other.

In a particularly preferred embodiment, the organometallic compound is added to reduce extrusion smoking in catalyst systems comprising the bridged bulky ligand metallocene catalyst of Formula (II), preferably bridged indenyl catalyst systems and even more preferably, bridged indenyl catalyst systems where the indenyl groups are methyl substituted indenyl groups.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/ 04257, WO 94/03506, WO96/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the polymerization process of the invention utilizes a bulky ligand metallocene catalyst compound represented by Formula (III):

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0,1 or 2. In Formula (III) above, $L^C$, A and J form a fused ring system. In an embodiment, $L^C$ of Formula (III) is as defined above for $L^A$, A, M and Q of Formula (III) are as defined above in Formula (I).

In Formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the polymerization process of the invention utilizes a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the polymerization process of the invention utilizes bulky ligand metallocene catalyst compounds represented Formula IV:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In Formula (IV), L and M are as defined above for Formula (I). Q is as defined above for Formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, now U.S. Pat. No. 6,103,657, which is herein incorporated by reference. In another embodiment, the bulky ligand metallocene catalyst compounds are those described in PCT publications WO 99/01481 and WO 98/42664, which are fully incorporated herein by reference.

In another embodiment, the polymerization process of the invention utilizes the bulky ligand metallocene catalyst compounds represented by Formula V:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the bulky ligand metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Other bulky ligand metallocene catalysts are those Group 5 and 6 metal imido complexes described in EP-A2-0 816 384 and U.S. Pat. No. 5,851,945, which is incorporated herein by reference. In addition, bulky ligand metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Activator Compositions

The above described bulky ligand metallocene polymerization catalyst compounds are typically activated in various ways to yield compounds having a vacant coordination site that will coordinate, insert, and polymerize olefin(s). For the purposes of this patent specification and appended claims, the term "activator" is defined to be any compound or component or method which can activate any of the bulky ligand metallocene catalyst. Non-limiting activators, for example, may include a Lewis acid or a non-coordinating ionic activator or ionizing activator or any other compound including Lewis bases, aluminum alkyls, conventional-type cocatalysts and combinations thereof that can convert a neutral bulky ligand metallocene catalyst to a catalytically active bulky ligand metallocene catalyst cation.

It is within the scope of this invention to use alumoxane or modified alumoxanes as an activator. There are a variety of methods for preparing alumoxane and modified alumoxanes, non-limiting examples of which are described in U.S. Pat. Nos. 4,665,208, 4,952,540, 5,091,352, 5,206, 199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

In one embodiment aluminoxanes or modified alumoxanes are combined with catalyst compound(s). In another embodiment modified methyl alumoxane in heptane (MMAO3A), commercially available from Akzo Chemicals, Inc., Holland, under the trade name Modified Methylalumoxane type 3A, (see for example those aluminoxanes disclosed in U.S. Pat. No. 5,041,584, which is herein incorporated by reference) is combined with the catalyst compound(s) to form a catalyst system.

Organoaluminum compounds useful as activators include trimethylaluminum, triethylaluminum, triisobutylaluminum, tri-n-hexylaluminum, tri-n-octylaluminum and the like.

It is within the scope of this invention to use an ionizing or stoichiometric activator, neutral or ionic, such as tri(n-butyl)ammonium tetrakis(pentafluorophenyl)boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene catalyst compound. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned, all of which are herein fully incorporated by reference.

In a preferred embodiment, the stoichiometric activators include a cation and an anion component, and may be represented by the following Formula:

$$(L-H)_d^+ (A^{d-}) \qquad (VI)$$

wherein

L is an neutral Lewis base;

H is hydrogen;

$(L-H)^+$ is a Bronsted acid $A^{d-}$ is a non-coordinating anion having the charge d− d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethyliniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2–6; n−k=d; M is an element selected from Group 13 of the Periodic Table of the Elements and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group.

Most preferably, the ionic stoichiometric activator $(L-H)_d^+(A^{d-})$ is N,N-dimethylanilinium tetra(perfluorophenyl)borate or triphenylcarbenium tetra(perfluorophenyl)borate.

Examples of suitable Ad also include diboron compounds as disclosed in U.S. Pat. No. 5,447,895, which is fully incorporated herein by reference.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenylditrimethylsilicate).4THF as an activator for a bulky ligand metallocene catalyst compound. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane)benzimidazolide), which are herein incorporated by reference.

The mole ratio of the metal of the activator component to the metal of the bulky ligand metallocene catalyst compounds are in the range of ratios between 0.3:1 to 1000:1, preferably 20:1 to 800:1, and most preferably 50:1 to 500:1. Where the activator is an aluminum-free ionizing activator such as those based on the anion tetrakis(pentafluorophenyl) boron, the mole ratio of the metal of the activator component to the metal component is preferably in the range of ratios between 0.3:1 to 3:1.

Supports, Carriers and General Supporting Techniques

The above described catalyst and/or activators may be combined with one or more support materials or carriers using one of the support methods well known in the art or as described below to form a supported catalyst system. For example, catalyst(s) and/or activator(s) may be deposited on, contacted with, vaporized with, bonded to, or incorporated within, adsorbed or absorbed in, or on, a support or carrier.

The terms "support" or "carrier", for purposes of this patent specification, are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds, zeolites, talc, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), phyllosilicate, and the like. Also, combinations of these support materials may be used, for example, silica-chromium, silica-alumina, silica-titania and the like. Additional support materials may include those porous acrylic polymers described in EP 0 767 184 B1, which is incorporated herein by reference.

It is preferred that the carrier, most preferably an inorganic oxide, has a surface area in the range of from about 10 to about 700 m²/g, pore volume in the range of from about 0.1 to about 4.0 cc/g and average particle size in the range of from about 5 to about 500 μm. More preferably, the surface area of the carrier is in the range of from about 50 to about 500 m²/g, pore volume of from about 0.5 to about 3.5 cc/g and average particle size of from about 10 to about 200 μm. Most preferably the surface area of the carrier is in the range is from about 100 to about 400 m²/g, pore volume from about 0.8 to about 3.0 cc/g and average particle size is from about 5 to about 100 μm. The average pore size of the carrier of the invention typically has pore size in the range of from 10 to 1000 Å, preferably 50 to about 500 Å, and most preferably 75 to about 350 Å.

Examples of supporting bulky ligand metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. No. 271,598 filed Jul. 7, 1994, now U.S. Pat. No. 5,468,702, and Ser. No. 788,736 filed Jan. 23, 1997, now U.S. Pat. No. 6,090,740, and PCT publications WO 95/32995, WO 95/14044, WO 96/06187 and WO 97/02297, and EP-B1-0 685 494 all of which are herein fully incorporated by reference.

There are various other methods in the art for supporting the polymerization catalysts. For example, the bulky ligand metallocene catalyst compound may contain a polymer bound ligand as described in U.S. Pat. Nos. 5,473,202 and 5,770,755, which is herein fully incorporated by reference, or may be spray dried as described in U.S. Pat. No. 5,648,310, which is herein fully incorporated by reference. The support used with the bulky ligand metallocene catalyst system of the invention may be functionalized as described in European publication EP-A-0 802 203, which is herein fully incorporated by reference, or at least one substituent or leaving group may be selected as described in U.S. Pat. No. 5,688,880, which is herein fully incorporated by reference.

In another embodiment, an antistatic agent or surface modifier, that is used in the preparation of the supported catalyst system as described in PCT publication WO 96/11960, which is herein fully incorporated by reference, may be used. The catalyst system may be prepared in the presence of an olefin, for example hexene-1.

In another embodiment, catalyst may be combined with a carboxylic acid salt of a metal ester, for example aluminum carboxylates such as aluminum mono, di- and tri-stearates, aluminum octoates, oleates and cyclohexylbutyrates, as described in U.S. application Ser. No. 09/113,216, filed Jul. 10, 1998, now abandoned.

A preferred method for producing a supported bulky ligand metallocene catalyst system is described below, and is described in U.S. application Ser. No. 265,533, filed Jun. 24, 1994, now abandoned and Ser. No. 265,532, filed Jun. 24, 19944, now abandoned and PCT publications WO 96/00245 and WO 96/00243 both published Jan. 4, 1996, all of which are herein fully incorporated by reference. In this preferred method, the catalyst compound is slurried in a liquid to form a catalyst solution or emulsion. A separate solution is formed containing an activator and a liquid. The liquid may be any compatible solvent or other liquid capable of forming a solution or the like with the catalyst compounds and/or activator. In the most preferred embodiment the liquid is a cyclic aliphatic or aromatic hydrocarbon, most preferably toluene. The catalyst compound and activator solutions are mixed together heated and added to a heated porous support or a heated porous support is added to the solutions such that the total volume of the bulky ligand metallocene catalyst compound solution and the activator solution or the bulky ligand metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

Organometallic Compounds

The organometallic compounds which are used in the invention to reduce the content of oligomers present in the polymerization product may be generally categorized by the formula $R_n^1 A$ wherein A is a Periodic Table Group 12 or 13 element, e.g., aluminum or boron, $R^1$ is the same or different, substituted or unsubstituted, straight or branched chain alkyl radical, cyclic hydrocarbyl radical, alkycyclohydrocarbyl radical, aromatic radical or alkoxide radical, and n is 2 or 3. More preferred such compounds are di or tri alkyl aluminum compounds, particularly tri-alkyl aluminums of the formula $AlR^1_3$, wherein $R^1$ is an alkyl group containing 1 to 10 carbon atoms. Suitable examples of such compounds include trimethyl aluminum, triethyl aluminum, tri n-propyl aluminum, triisopropyl aluminum, trisobutyl aluminum, tri n-pentyl aluminum and like aluminum alkyls, including their hydrides.

The organometallic compounds are preferably introduced into the polymerization reactor in the form of a solution, e.g. 1–30% solution, in suitable organic solvent such as hexane, pentane or isopentane carrier solution. In the gas phase process, the solution may be introduced into the reactor with the monomer and other gases such as hydrogen either directly or via a recycle stream. The organometallic compound is present in the reactor continuously during polymerization.

The amount of organometallic compound present in the polymerization environment should be such that the polymerization product contains at least about 50 weight ppm, more preferably from about 50 to about 5000 weight ppm, even more preferably from about 50 to about 2000 weight ppm of the organometallic compound, based on the weight of the polymer product. Preferably, the amount of organometallic compound present in the polymerization environment as such that the polymerization product contains at least about 250, more preferably at least about 500, most preferably at least about 1,000 weight ppm of the organometallic compound. In general the higher the content of organometallic compound present in the polymer product, the lower the content of low molecular weight oligomers present in that product.

Method of Delivery

The supported bulky ligand metallocene catalyst compound or catalyst system is delivered into a polymerization reactor by various known methods in the art. For example, U.S. Pat. No. 4,543,399, which is fully incorporated herein by reference, describes a catalyst feeder mechanism for introducing a catalyst to a reactor. In an embodiment of the invention, the supported metallocene catalyst system of the invention may be fed to a reactor in the catalyst feeder mechanism described in PCT publication WO 97/46599, which is fully incorporated herein by reference. Other catalyst feeders useful in the invention include slurry feeders, rotary and shot feeders, intermittent and continuous feeders.

In one embodiment, the bulky ligand metallocene catalyst compound or catalyst system is delivered into a polymerization reactor by at least one carrier solution. In another embodiment, a supported bulk ligand metallocene catalyst compound or catalyst system is contacted with at least one carrier solution prior to being introduced into the polymerization zone in a polymerization reactor.

In one embodiment of the invention, the bulky ligand metallocene catalyst system is delivered into the polymerization reactor intermittently or continuously by a carrier solution, preferably the carrier solution is introduced continuously with the catalyst system.

In another embodiment of the invention, when transitioning from a first catalyst to a second catalyst, preferably where the first and second catalyst is a bulky ligand metallocene catalyst compound, more preferably where the second catalyst is a bridged, bulky ligand metallocene catalyst compound, it would be preferable during the transition to use a carrier solution to deliver the second catalyst compound to the polymerization reactor.

In another embodiment of the invention, when starting up a polymerization process the supported bulky ligand metallocene catalyst system is initially delivered to the polymerization zone in the reactor by a carrier solution. Once the polymerization process has stabilized, preferably where the process is producing one or more of the desired product (density and/or melt index), the desired production rate and/or the desired catalyst productivity, the supported bulky ligand metallocene catalyst system is then introduced to the reactor without a carrier solution, for example with an inert gas such as nitrogen.

The carrier solution may include at least one organometallic compound, examples of which are described above, and a liquid diluent. Examples of liquid diluents include one or more olefin(s) or non-polymerizable hydrocarbons. Non-limiting examples of olefin(s) include those having from 2 to 20 carbon atoms, such as ethylene, propylene, butene-1, 4-methyl-pentene-1, hexene-1 and octene-1. Non-limiting examples of liquid diluents include saturated or unsaturated hydrocarbons. Examples of suitable liquid diluents are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. The preferred hydrocarbons are $C_4$ and $C_6$ saturated hydrocarbons. It is contemplate that other liquid diluents may include cyclic aliphatic or aromatic hydrocarbon, for example toluene. However, one in the art would appreciate using a liquid diluent having no or little effect on the performance of the catalyst.

It is also within the scope of the invention that the carrier solution, in an embodiment, may include an amount of other components such as olefins, diolefins or mixtures thereof.

It is also contemplated that a gas such as nitrogen, ethylene or propylene or the like, preferably an inert gas such as nitrogen may be used in combination with the carrier solution of the invention.

In one embodiment the supported bulky ligand metallocene catalyst system, preferably where the supported bulky ligand metallocene catalyst system is preformed and/or in a dry state, is slurried with a carrier solution prior its introduction into the reactor.

In another embodiment, the carrier solution contains a sufficient amount of an antistatic agent to yield in the range of from 2 to 100 ppm of the antistatic agent based on the bed weight in the reactor, more preferably in the range of from about 5 to 30 ppm, and most preferably in the range of from about 5 to about 20 ppm.

In an embodiment of the invention the contact time of the supported bulky ligand metallocene catalyst system with the carrier solution prior to the supported bulky ligand metallocene catalyst system entering the polymerization zone in the reactor is in the range of from several days to less than a few seconds to less than one second, preferably less than 1 hour, more preferably less than 1 minute, even more preferably less than 30 seconds, still even more preferably less than 15 seconds, and most preferably less than about 2 seconds.

Polymerization Process

The bulky ligand metallocene catalyst compounds and catalyst systems of the invention described above are suitable for use in any polymerization process. The polymerization process of the invention includes a solution, gas or slurry process (including a high pressure process) or a combination thereof, more preferably a gas or slurry phase process.

In an embodiment, this invention is directed toward the solution, slurry or gas phase polymerization or copolymerization reactions involving the polymerization of one or more of the olefin monomer(s) having from 2 to 30 carbon atoms, preferably 2 to 12 carbon atoms, and more preferably 2 to 8 carbon atoms. The invention is particularly well suited to homo- or copolymerization reactions involving the polymerization of one or more olefin monomers of ethylene, propylene, butene-1, pentene-1, 4-methyl-pentene-1, hexene-1, octene-1, decene-1, and cyclic olefins or a combination thereof. Other monomers can include vinyl monomers, diolefins such as dienes, polyenes, norbornene, norbornadiene monomers.

In another embodiment ethylene or propylene is polymerized with at least two different comonomers to form a terpolymer; the preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In the most preferred embodiment the process of the invention relates to the polymerization of ethylene and at least one comonomer having from 4 to 8 carbon atoms in the presence of a bulky ligand metallocene catalyst compound and an activator supported on a carrier. Particularly, the comonomers are butene-1, 4-methyl-pentene-1, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

Polymer Product of the Invention

The polymers produced by the process of the invention can be used in a wide variety of products and end-use applications. The polymers typically have a density in the range of from 0.86g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc.

The polymers of the invention typically have a narrow molecular weight distribution, a weight average molecular weight to number average molecular weight ($M_w/M_n$) of greater than 1.5 to about 10, particularly greater than 2 to about 8, more preferably greater than about 2.2 to less than 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993 which is fully incorporated herein by reference.

The polymers of the invention in one embodiment have CDBI's generally in the range of greater than 50% to 99%, preferably in the range of 55% to 85%, and more preferably 60% to 80%, even more preferably greater than 60%, still even more preferably greater than 65%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in one embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples of polymerization processes and their polymerization results, are offered.

Catalyst Preparation

The catalyst used in the following examples was prepared by first mixing dimethylsilylbis (2-methylindenyl)-zirconium dichloride (SIZR-2) (purchased from Boulder Scientific Co., Boulder, Colo.), methylalumoxane (MAO, 30 wt %, purchased from Akzo Chemical Co., Holland) and toluene in a 1 liter schienk flask, followed by the addition of silica 955 (purchased from Davidson, Columbia, Mass., calcinated at 600 degrees). The resulting slurry was then dried down to dryness under vacuum with a jacket temperature of about 100° C. The dried free flowing catalyst was then passed through a #35–60 mesh screen to remove chips that may be formed. The resulting catalyst contains about 0.035 mmole/g of zirconium and has an Al/Zr molar ratio of about 180.

Polymerization Procedure

Polymerizations were carried out in the gas phase using an 8 inch fluid bed reactor. Before polymerization, a polyethylene pre-bed was loaded into the reactor. It was then purged with dry nitrogen. A small amount of aluminum alkyl scavenger may also be added at this moment. Then the above catalyst (in the form of dry powder or a mineral oil slurry), ethylene monomer, co-monomer (1-hexene), hydrogen and nitrogen gases were continuously injected into the reactor, along with the continues injection of the indicated organometallic compound which was injected through a separate injection port. The gaseous composition was continuously monitored by in-line GC. Polymerization was carried out at 75 to 85° C. When the reactor bed weight reached a certain level, polyethylene product can be discharged through a discharge port.

Example 1

The following examples demonstrate the effectiveness of tri(isobutyl)aluminum (TIBA) in suppressing the oligomer formation. Eight polymerizations were conducted at various levels of TIBA. Polymerization conditions are shown in Table 1. The amount of oligomers present in the final polyethylene product produced in each run was measured by thermogravimetric analysis (TGA) by heating the product to 200° C. and measuring the % weight loss. This oligomer level has also been measured by Gel Permeation Chromotography (GPC) by measuring the amount of material having Mw below 1000. As is shown in Table 1, the TGA weight loss as well as CLMS, defined below, were markedly reduced as the amount of TIBA present during polymerization increases, as reflected by TIBA content in the polymer product. These examples demonstrate that only when the aluminum alkyl level is high enough, the oligomer formation can be effectively suppressed.

Example 2

These examples demonstrate that another aluminum alkyl, triethylaluminum (TEAL) can also suppress oligomer formation when present in sufficient amount in the reactor. Four additional polymerizations were conducted similarly as above but using different quantities of TEAL instead of TIBA. Polymerization conditions, TGA weight loss as well as CLMS oligomer content measurements are shown in Table 2. These examples show that the TEAL level needs to be high enough to sufficiently suppress the oligomer level to acceptable level.

TABLE 1

Effect of Co-Feeding TIBA on oligomer reduction

| Run # | ethylene (psia) | TIBA residue (ppm)[1] | Melt Index | Density | Zr residue (ppm) | wt loss by TGA @ 200° C. %[2] | CLMS[3] % | Mw(by GPC) |
|---|---|---|---|---|---|---|---|---|
| 1 | 240 | 0 | 1.9 | 0.930 | 1.5 | 0.93 | 6.8 | 75900 |
| 2 | 240 | 65 | 1.2 | 0.920 | 1.9 | 0.90 | 6.5 | 79200 |
| 3 | 240 | 60 | 1.3 | 0.917 | 1.1 | 0.97 | 7.0 | 79800 |
| 4 | 240 | 90 | 1.2 | 0.923 | 1.4 | 0.91 | 3.8 | 78800 |
| 5 | 240 | 420 | 1.1 | 0.915 | 1.8 | 0.25 | 0.6 | 82400 |
| 6 | 240 | 680 | 0.5 | 0.918 | 0.9 | 0.22 | 0.5 | 81900 |
| 7 | 240 | 1940 | 0.7 | 0.918 | 1.2 | 0.15 | 0.1 | 83300 |
| 8 | 120 | 1940 | 1.5 | 0.918 | 2.4 | 0.04 | 0.1 | 94280 |

Polymerization conditions: Reactor Temp = 75° C., 1-hexene/ethylene = 0.008 (mole). Hydrogen/ethylene 0.01(mole); Standard Formulation catalyst (fed as dry powder). Zr 0.03 mmole/g; Al/Zr = 180.
[1]TIBA residue in polyethylene product was based on aluminum level measured by ICP technique.
[2]Zirconium residue in polyethylene product was measured by ICP.
[3]CLMS is defined as polymer material having Mw below 1000 in gel permeation chromatography (GPC) measurement. It is a measure of oligomer content.

TABLE 2

Effect of co-feeding TEAL on oligomer reduction

| Run # | TEAL residue (ppm) | MI | Density | Zr ppm | wt loss by TGA @ 200° C. % | CLMS % | Mw |
|---|---|---|---|---|---|---|---|
| 9 | 0 | 1.3 | 0917 | 1.2 | 0.97 | 7.0 | 79800 |
| 10 | 250 | 0.9 | 0.918 | 1.2 | 0.24 | 0.5 | 77500 |
| 11 | 490 | 3.1 | 0.919 | 2.4 | 0.21 | 0.5 | 75000 |
| 12 | 630 | 0.30 | 0.919 | 1.4 | 0.10 | 0.3 | 80350 |

Polymerization conditions: Temp = 75° C., ethylene pressure 240 psia, 1-hexenc/ethylene = 0.008, hydrogen/ethylene = 0.01.

When polymers produced as described above were extruded at about 150° C., it was found that the amount of extruder "smoke" emanating from the extruder was inversely proportional to the quantity of aluminum alkyl present in the polymer product. For example, no smoke was detected when the polymer produced from Runs 7 and 8 were processed, while the greatest amount of smoke was produced in Runs 1–6.

We claim:

1. A process for polymerizing ethylene and at least one comonomer having from 4 to 8 carbon atoms, the process comprising utilizing a catalyst system comprising a bulky ligand metallocene catalyst compound, in the presence of at least one organometallic compound represented by the formula $R^1_n A$ wherein A is a Periodic Table Group 12 or 13 element, $R^1$ is the same or different, substituted or unsubstituted, straight or branched chain alkyl radical, cyclic hydrocarbyl radical, alkyl-cyclohydrocarbyl radical, aromatic radical or alkoxide radical and n is 2 or 3, to produce a polymer product having a content of the organometallic compound of at least 250 ppm by weight.

2. The process of claim 1 wherein the organometallic compound is a trialkyl aluminum compound of the formula $AlR^1_3$ wherein R contains 1–10 carbon atoms.

3. The process of claim 2 wherein the organometallic compound is triethyl aluminum.

4. The process of claim 2 wherein the organometallic compound is triisobutyl aluminum.

5. The process of claim 1 wherein the bulky ligand metallocene catalyst compound is a bridged bulky ligand metallocene catalyst compound.

6. The process of claim 1 wherein polymerization occurs in a gas phase reactor.

7. A process for polymerizing ethylene and at least one comonomer having from 4 to 8 carbon atoms, the process comprising utilizing a catalyst system comprising a bulky ligand metallocene catalyst compound, in the presence of at least one trialkyl aluminum compound of the formula $AlR^1_3$ wherein R contains 1–10 carbon atoms, to produce a polymer product having a content of the trialkyl aluminum compound of at least 250 ppm by weight.

8. The process of claim 7 wherein the trialkyl aluminum compound is selected from the group consisting of trimethyl aluminum, triethyl aluminum, tri n-propyl aluminum, triisopropyl aluminum, trisobutyl aluminum, and tri n-pentyl aluminum.

9. The process of claim 7 wherein the bulky ligand metallocene catalyst compound is a bridged bulky ligand metallocene catalyst compound.

10. The process of claim 7 wherein polymerization occurs in a gas phase reactor.

11. The process of claim 1 wherein the polymer product is extruded at about 150° C. and wherein an amount of extruder smoke is inversely proportional to an amount of at the least one organometallic compound.

12. The process of claim 1 wherein the polymer product has an oligomer content of less than 0.5% by weight wherein oligomer content is measured as low molecular weight species having a number average molecular weight in the range of about 200 to 1000 as determined using gel permeation chromatography.

* * * * *

UNITED STATES PATENT AND TRADEMARK OFFICE
CERTIFICATE OF CORRECTION

PATENT NO.    : 6,538,081 B2  
DATED         : March 25, 2003  
INVENTOR(S)   : Natarajan Muruganandam, Xinmin Yang and Frederick Karol Page 1 of 1

It is certified that error appears in the above-identified patent and that said Letters Patent is hereby corrected as shown below:

<u>Title page,</u>  
Item [74], *Attorney, Agent, or Firm*, "Osborn K. McKinney" should be deleted, and the name -- Osborne K. McKinney -- inserted therefore.

Signed and Sealed this

Twenty-first Day of October, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,538,081 B2
DATED : March 25, 2003
INVENTOR(S) : Natarajan Muruganandam, Xinmin Yang and Frederick Karol It is certified that error appears in the above-identified patent and that said Letters Patent is hereby corrected as shown below:

Title page,
Item [73], Assignee, please insert -- Univation Technologies, LLC, Houston, Texas (US) --.

Signed and Sealed this

Twenty-second Day of February, 2005

JON W. DUDAS
*Director of the United States Patent and Trademark Office*